US011955105B2

(12) United States Patent
Phillips

(10) Patent No.: US 11,955,105 B2
(45) Date of Patent: Apr. 9, 2024

(54) VOCAL MUSIC PRODUCTION APPARATUS

(71) Applicant: William Phillips, Danville, IL (US)

(72) Inventor: William Phillips, Danville, IL (US)

( * ) Notice: Subject to any disclaimer, the term of this patent is extended or adjusted under 35 U.S.C. 154(b) by 472 days.

(21) Appl. No.: 17/233,857

(22) Filed: Apr. 19, 2021

(65) Prior Publication Data

US 2022/0335917 A1 Oct. 20, 2022

(51) Int. Cl.

| | |
|---|---|
| ***G10H 5/00*** | (2006.01) |
| ***G10H 1/00*** | (2006.01) |
| ***G10H 7/00*** | (2006.01) |

(52) U.S. Cl.

CPC ........... *G10H 5/005* (2013.01); *G10H 1/0008* (2013.01); *G10H 7/00* (2013.01)

(58) Field of Classification Search

CPC ......... G10H 5/005; G10H 1/0008; G10H 7/00
USPC ........................................................... 84/600
See application file for complete search history.

(56) References Cited

U.S. PATENT DOCUMENTS 4,463,650 A * 8/1984 Rupert ..................... G10H 7/04 984/378
4,915,001 A * 4/1990 Dillard ..................... G10H 7/00 984/378
6,473,631 B1 * 10/2002 Siddoway ........... H04M 1/0264 379/433.02
6,556,235 B1 * 4/2003 Saburi .............. G08B 13/19684 348/14.02
6,653,546 B2 * 11/2003 Jameson ................ G10H 3/125 84/735
7,574,273 B2 * 8/2009 Obata .................. H05K 5/0278 381/361
D634,727 S * 3/2011 Wakabayashi ............... D14/167
D655,270 S * 3/2012 Jain .............................. D14/167
D660,282 S * 5/2012 Amano ......................... D14/154
8,237,042 B2 * 8/2012 Scharfeld ............... G10H 1/053 84/662
D674,370 S * 1/2013 Ohta ............................ D14/167
8,680,383 B1 * 3/2014 Taylor .................. G09B 15/023 84/477 R
9,286,875 B1 * 3/2016 Kerr ....................... G10D 13/26
D802,626 S * 11/2017 Huang ...................... D14/203.3

(Continued)

FOREIGN PATENT DOCUMENTS

CN 206117984 U * 4/2017
WO WO03030142 4/2003

(Continued)

*Primary Examiner* — Christina M Schreiber

(57) ABSTRACT

A vocal music production apparatus for converting vocalized music to produced instrumentals includes a housing front side, a housing back side, a housing left side, a housing right side, a housing top side, and a housing bottom side. A touch screen is coupled to the housing within the housing front side. A microprocessor is coupled within the housing and is in operational communication with the touch screen. The microprocessor includes a digital synthesizer to convert vocal audio inputs to digital music. A microphone, a speaker, a headphone jack, and a battery are coupled to the housing and are in operational communication with the microprocessor. A port is coupled to the housing and is in operational communication with the microprocessor and the battery. A plurality of control buttons is coupled to the housing and is in operational communication with the microprocessor.

10 Claims, 4 Drawing Sheets

(56) References Cited

U.S. PATENT DOCUMENTS

| | | | | |
|---|---|---|---|---|
| 2001/0033666 | A1* | 10/2001 | Benz | G11B 27/028 381/119 |
| 2003/0100965 | A1* | 5/2003 | Sitrick | G10G 1/00 700/83 |
| 2004/0206226 | A1* | 10/2004 | Negoescu | G10H 7/006 84/600 |
| 2004/0250276 | A1* | 12/2004 | Cana | H04M 1/72409 725/111 |
| 2007/0103541 | A1* | 5/2007 | Carter | H04M 11/025 348/14.06 |
| 2008/0165631 | A1* | 7/2008 | Mamane | H04B 1/202 369/24.01 |
| 2008/0165989 | A1* | 7/2008 | Seil | G11B 27/034 381/119 |
| 2009/0160792 | A1* | 6/2009 | Morohoshi | G06F 3/0488 345/173 |
| 2009/0174759 | A1* | 7/2009 | Yeh | H04N 7/148 348/E7.078 |
| 2010/0079938 | A1* | 4/2010 | Paschke | G06F 1/1624 345/173 |
| 2014/0000440 | A1* | 1/2014 | Georges | G10H 7/00 84/609 |
| 2015/0270734 | A1* | 9/2015 | Davison | H04B 1/3888 320/103 |
| 2016/0163298 | A1* | 6/2016 | Butera | G10H 1/342 84/615 |
| 2017/0109127 | A1* | 4/2017 | Osborn | G06F 3/0482 |
| 2021/0377647 | A1* | 12/2021 | Reece | G06F 3/162 |
| 2022/0335917 | A1* | 10/2022 | Phillips | G10H 7/00 |

FOREIGN PATENT DOCUMENTS

| | | | | |
|---|---|---|---|---|
| WO | WO-2015127672 | A1 * | 9/2015 | G11B 27/105 |
| WO | WO-2019050083 | A1 * | 3/2019 | G10H 1/0008 |
| WO | WO-2021127291 | A2 * | 6/2021 | G06Q 20/18 |

* cited by examiner

VOCAL MUSIC PRODUCTION APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to music production devices and more particularly pertains to a new music production device for converting vocalized music to produced instrumentals. The present device includes a touch screen apparatus with a synthesizer. There is also a foldable kickstand and a plurality of rubberized grips.

(2) Description of Related Art Including Information Disclosed Under 37 CFR 1.97 and 1.98

The prior art relates to music production devices. Known devices are intended for use with traditional music production equipment and do not operate as standalone devices. These devices lack internal synthesizers and touch screen operation to complete the full production of a song from vocalized inputs.

BRIEF SUMMARY OF THE INVENTION

An embodiment of the disclosure meets the needs presented above by generally comprising a housing having a housing front side, a housing back side, a housing left side, a housing right side, a housing top side, and a housing bottom side. A touch screen is coupled to the housing within the housing front side. A microprocessor is coupled within the housing and is in operational communication with the touch screen. The microprocessor includes a digital synthesizer to convert vocal audio inputs to digital music. A microphone, a speaker, and a battery are coupled to the housing and are in operational communication with the microprocessor. A port is coupled to the housing. The port is in operational communication with the microprocessor and the battery. A headphone jack is coupled to the housing and is in operational communication with the microprocessor. A plurality of control buttons is coupled to the housing. The plurality of control buttons is in operational communication with the microprocessor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
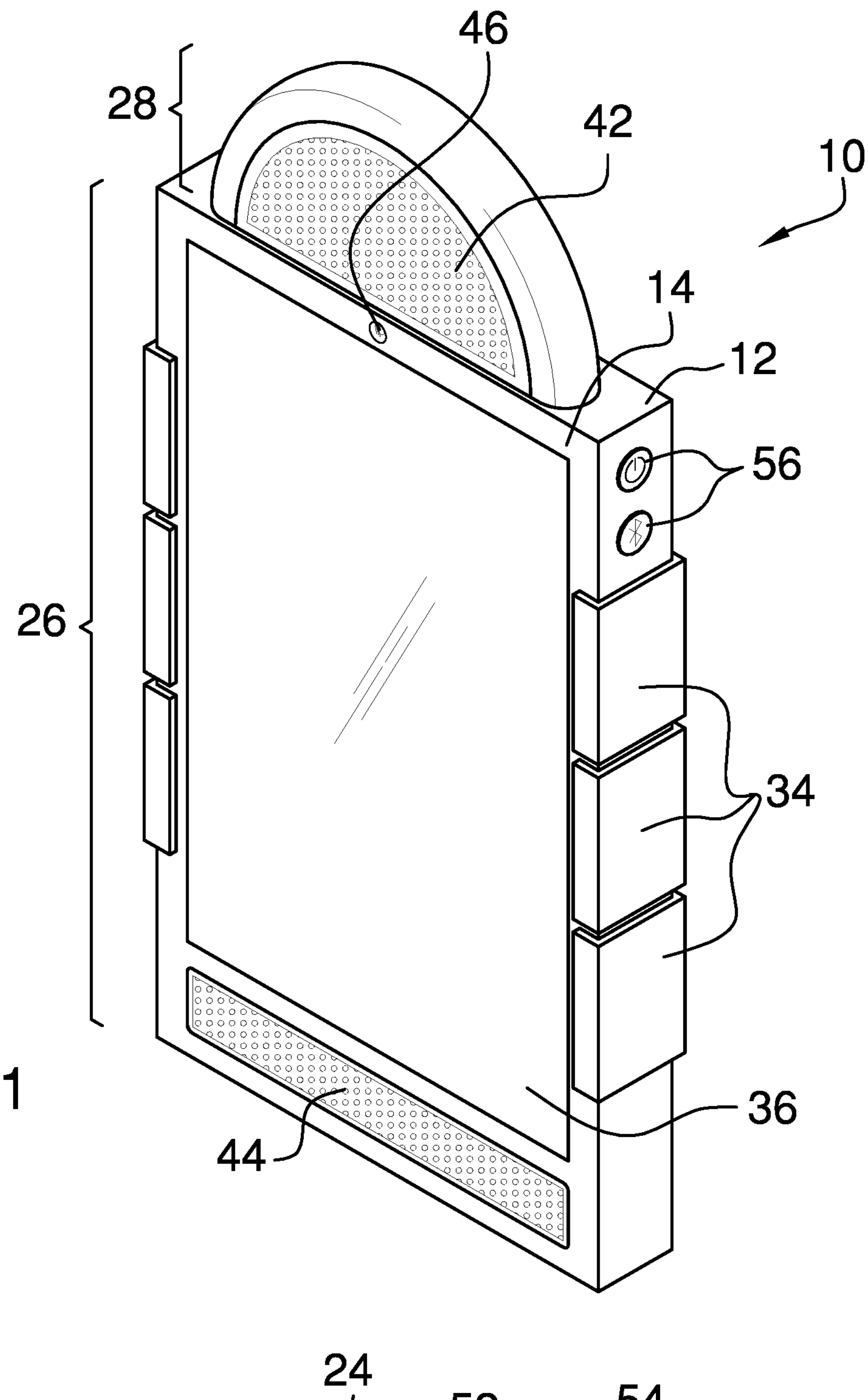
FIG. 1 is an isometric view of a vocal music production apparatus according to an embodiment of the disclosure.
Figure 2:
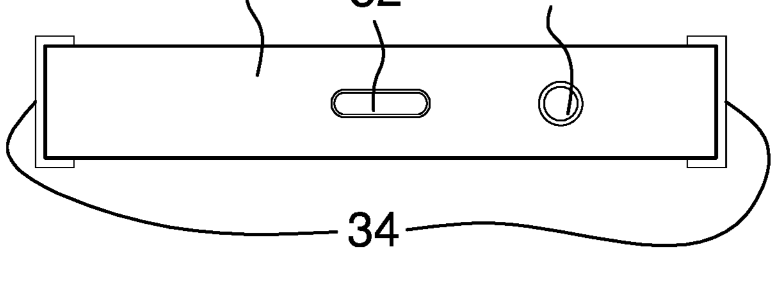
FIG. 2 is a bottom plan view of an embodiment of the disclosure.
Figure 3:
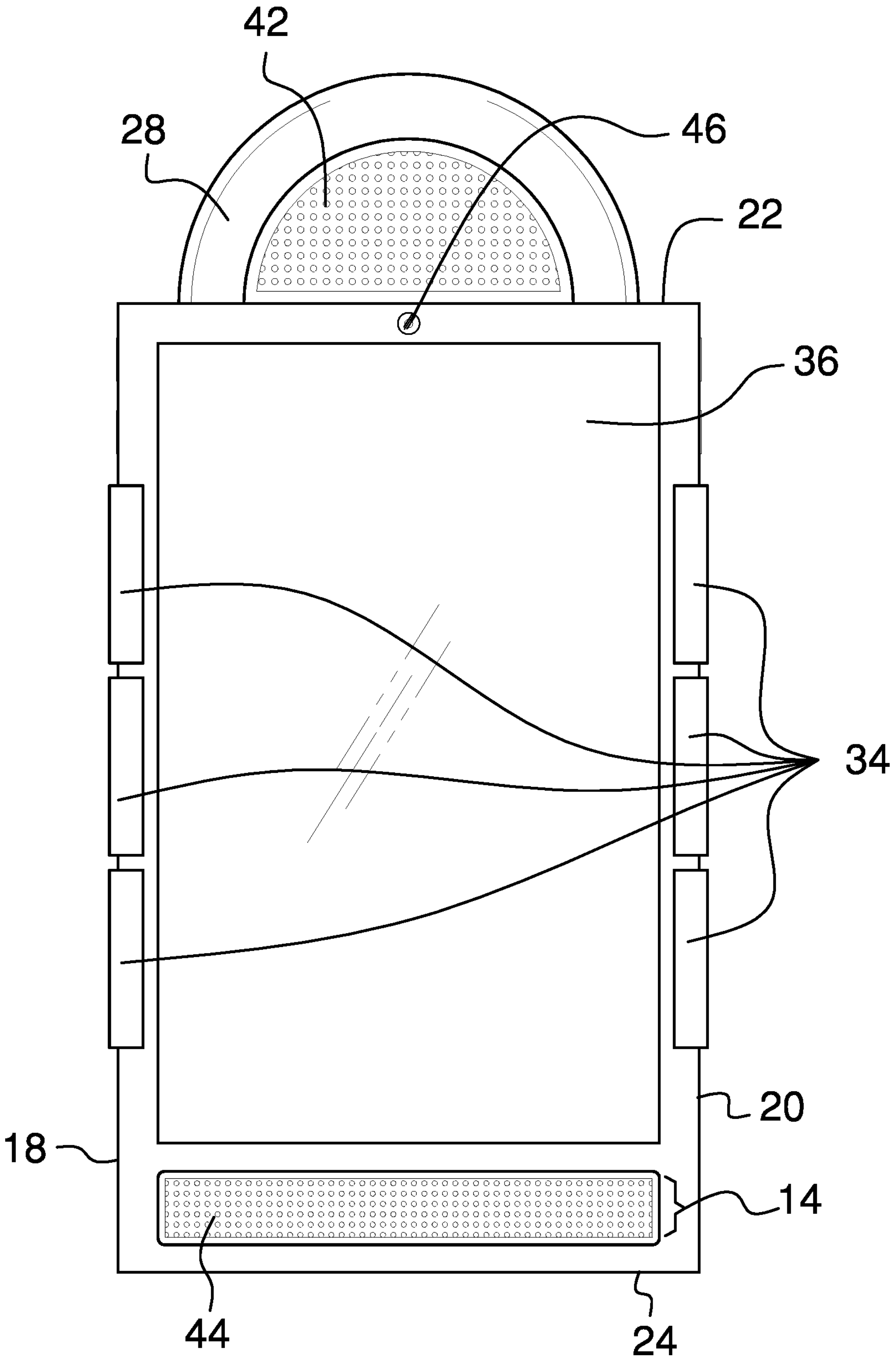
FIG. 3 is a front elevation view of an embodiment of the disclosure.
Figure 4:
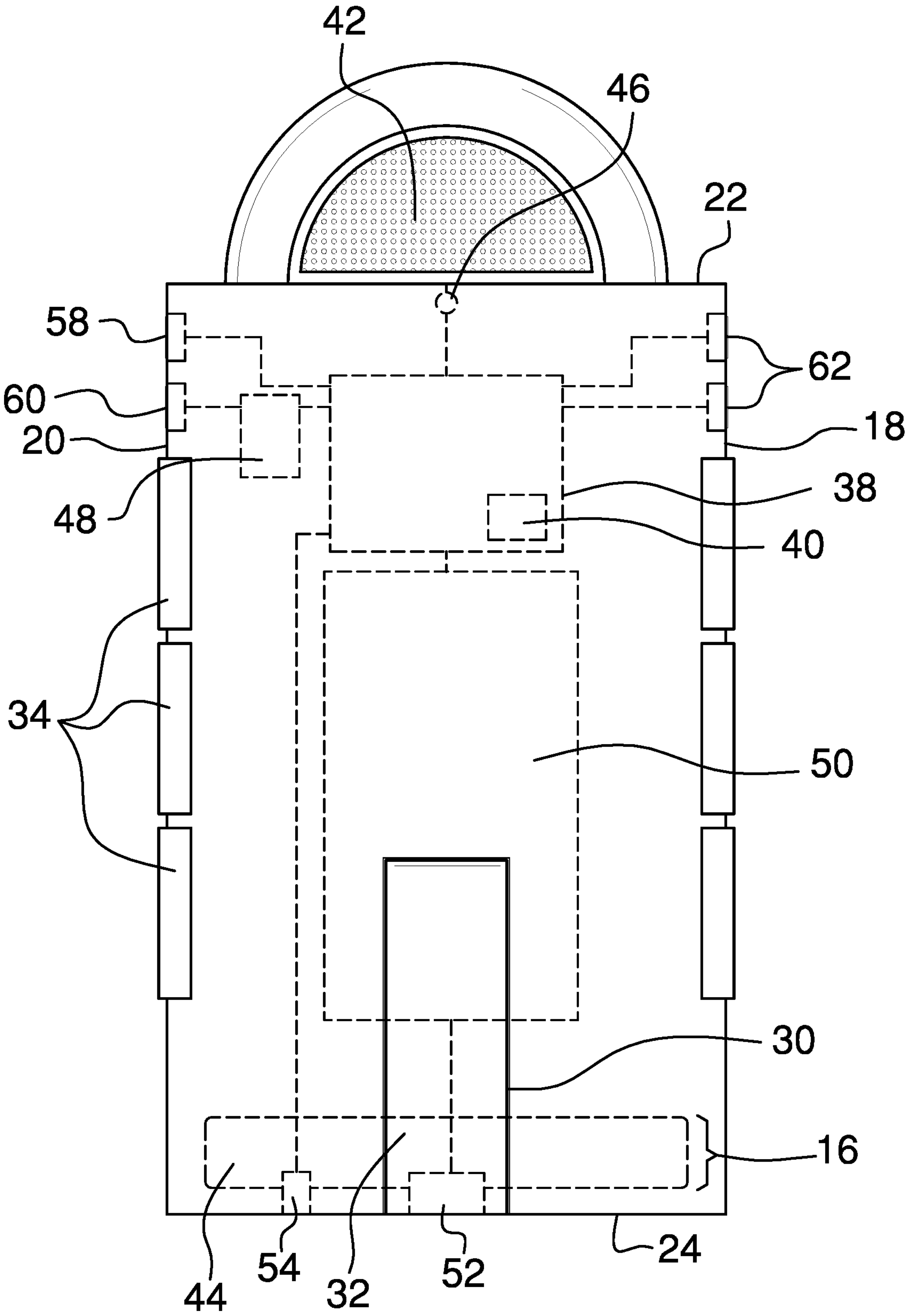
FIG. 4 is a rear elevation view of an embodiment of the disclosure.

With reference now to the drawings, and in particular to FIGS. 1 through 5 thereof, a new music production device embodying the principles and concepts of an embodiment of the disclosure and generally designated by the reference numeral 10 will be described.

As best illustrated in FIGS. 1 through 5, the vocal music production apparatus 10 generally comprises a housing 12 having a housing front side 14, a housing back side 16, a housing left side 18, a housing right side 20, a housing top side 22, and a housing bottom side 24. The housing 12 may have a rectangular prismatic body portion 26 and a semi-circular head portion 28 extending from the housing top side 22. The head portion 28 may be rounded for user comfort. The housing back side 16 may have a stand cavity 30 extending down to the housing bottom side 16.

Figure 5:
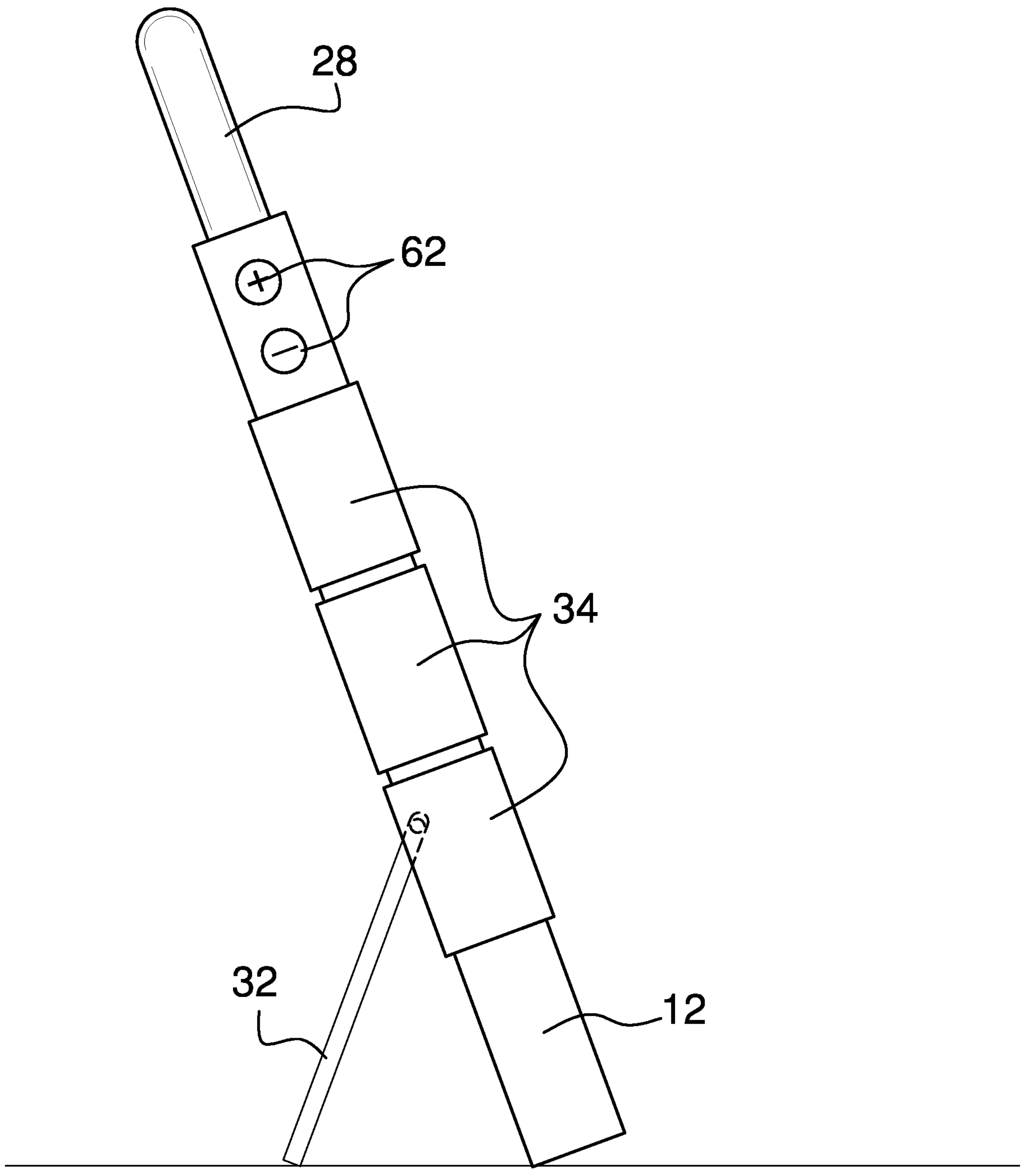
FIG. 5 is a side elevation view of an embodiment of the disclosure.

A kickstand 32 is coupled to the housing back side 16 and extends to the housing bottom side 24. The kickstand 32 is pivotably coupled within the stand cavity 30 and moves between a folded position flush with the housing back side 16 and an extended position protruding from the housing back side 16 to support the housing 12 in conjunction with the housing bottom side 24 as shown in FIG. 5.

A plurality of rubber grips 34 is coupled to the housing 12. The plurality of rubber grips 34 is coupled to the housing left side 18 and the housing right side 20. Each of the rubber grips 34 may be a squared U-shape and extends onto the housing front side 14 and the housing back side 16 to provide additional grip and protection. The plurality of rubber grips 34 may include three rubber grips 34 coupled to each of the housing left side 18 and the housing right side 20.

A touch screen 36 is coupled to the housing 12. The touch screen 36 is coupled within the housing front side 14. A microprocessor 38 is coupled within the housing 12 and is in operational communication with the touch screen 36. The microprocessor 38 includes a digital synthesizer 40 to convert vocal audio inputs to digital music. A microphone 42 is coupled to the housing 12. The microphone 42 may be coupled to the head portion 28 and is in operational communication with the microprocessor 38 to send vocal audio inputs to the digital synthesizer 40. The microphone 42 may be semicircular. The microprocessor 38 may capture audio samples from the microphone 42 or from existing audio files. The microprocessor 38 may sample up to 15 seconds of the audio to then create a new track to be manipulated by the touch screen 36 inputs and added digital music from the digital synthesizer 40.

A speaker 44 is coupled to the housing 12. The speaker 44 may be coupled to the housing front side 14 beneath the touch screen 36. The speaker 44 is in operational communication with the microprocessor 38 to play back the digital music being created. A camera 46 may be coupled to the housing 12. The camera 46 is coupled to the housing front side 14 proximal the housing top side 22. The camera 46 is in operational communication with the microprocessor 38 to record the user while making music. A Bluetooth transceiver 48 may be coupled within the housing 12 and is in operational communication with the microprocessor 38. The Bluetooth transceiver 48 allows for wireless communication with other electronic devices to share the music and videos created.

A battery 50 is coupled within the housing 12 and is in operational communication with the microprocessor 38. A port 52 is coupled to the housing 12. The port 52 is in operational communication with the microprocessor 38 and the battery 50 to both transfer data and power. The port 52 may extend through the housing bottom side 24 and may be a Universal Serial Bus Type-C port. A headphone jack 54 is coupled to the housing 12 and is in operational communication with the microprocessor 38. The headphone jack 54 is configured to receive a pair of headphones to bypass the speaker 44 and allow the user to work and listen to the music created.

A plurality of control buttons 56 is coupled to the housing 12. The plurality of control buttons 56 is in operational communication with the microprocessor 38 and may include a power button 58, a Bluetooth pairing button 60, and a pair of volume buttons 62.

In use, the user hums or beatboxes music into the microphone 42. The user then utilizes the touchscreen 36 to manipulate the digital synthesizer 40 and convert the vocal audio input into digital music of his or her choosing. The user may then share the digital music using the Bluetooth transceiver 48 or the port 52. The user may also share video captured by the camera 46 directly to social media platforms.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vocal music production apparatus comprising:

a housing having a housing front side, a housing back side, a housing left side, a housing right side, a housing top side, and a housing bottom side, the housing having a rectangular prismatic body portion and a semicircular head portion extending from the housing top side;

a touch screen coupled to the housing, the touch screen being coupled within the housing front side;

a microprocessor coupled within the housing, the microprocessor being in operational communication with the touch screen and including a digital synthesizer to convert vocal audio inputs to digital music;

a microphone coupled to the housing, the microphone being in operational communication with the microprocessor, the microphone being coupled to the head portion, the microphone being semicircular such that an arcuate outer edge of the microphone is evenly inwardly spaced from an outer peripheral edge of the head portion of the housing;

a speaker coupled to the housing, the speaker being in operational communication with the microprocessor;

a battery coupled within the housing, the battery being in operational communication with the microprocessor;

a port coupled to the housing, the port being in operational communication with the microprocessor and the battery;

a headphone jack coupled to the housing, the headphone jack being in operational communication with the microprocessor; and a plurality of control buttons coupled to the housing, the plurality of control buttons being in operational communication with the microprocessor.

2. The vocal music production apparatus of claim 1 further comprising the speaker being coupled to the housing front side beneath the touch screen.

3. The vocal music production apparatus of claim 1 further comprising a plurality of rubber grips coupled to the housing.

4. The vocal music production apparatus of claim 3 further comprising the plurality of rubber grips being coupled to the housing left side and the housing right side.

5. The vocal music production apparatus of claim 4 further comprising each of the rubber grips being a squared U-shape and extending onto the housing front side and the housing back side.

6. The vocal music production apparatus of claim 1 further comprising a camera coupled to the housing, the camera being coupled to the housing front side proximal the housing top side, the camera being in operational communication with the microprocessor.

7. The vocal music production apparatus of claim 1 further comprising a kickstand coupled to the housing back side and extending to the housing bottom side.

8. The vocal music production apparatus of claim 7 further comprising the housing back side having a stand cavity extending down to the housing bottom side, the kickstand being pivotably coupled within the stand cavity and moving between a folded position flush with the housing back side and an extended position protruding from the housing back side to support the housing in conjunction with the housing bottom side.

9. The vocal music production apparatus of claim 1 further comprising a Bluetooth transceiver coupled within the housing, the Bluetooth transceiver being in operational communication with the microprocessor.

10. A vocal music production apparatus comprising:

a housing having a housing front side, a housing back side, a housing left side, a housing right side, a housing top side, and a housing bottom side, the housing having a rectangular prismatic body portion and a semicircular head portion extending from the housing top side, the housing back side having a stand cavity extending down to the housing bottom side;

a kickstand coupled to the housing back side and extending to the housing bottom side, the kickstand being pivotably coupled within the stand cavity and moving between a folded position flush with the housing back side and an extended position protruding from the housing back side to support the housing in conjunction with the housing bottom side;

a plurality of rubber grips coupled to the housing, the plurality of rubber grips being coupled to the housing left side and the housing right side, each of the rubber grips being a squared U-shape and extending onto the housing front side and the housing back side;

a touch screen coupled to the housing, the touch screen being coupled within the housing front side;

a microprocessor coupled within the housing, the microprocessor being in operational communication with the touch screen and including a digital synthesizer to convert vocal audio inputs to digital music;

a microphone coupled to the housing, the microphone being coupled to the head portion, the microphone being in operational communication with the microprocessor, the microphone being semicircular such that an arcuate outer edge of the microphone is evenly inwardly spaced from an outer peripheral edge of the head portion of the housing;

a speaker coupled to the housing, the speaker being coupled to the housing front side beneath the touch screen, the speaker being in operational communication with the microprocessor;

a camera coupled to the housing, the camera being coupled to the housing front side proximal the housing top side, the camera being in operational communication with the microprocessor;

a Bluetooth transceiver coupled within the housing, the Bluetooth transceiver being in operational communication with the microprocessor;

a battery coupled within the housing, the battery being in operational communication with the microprocessor;

a port coupled to the housing, the port being in operational communication with the microprocessor and the battery;

a headphone jack coupled to the housing, the headphone jack being in operational communication with the microprocessor; and a plurality of control buttons coupled to the housing, the plurality of control buttons being in operational communication with the microprocessor.

* * * * *